(12) United States Patent
Matsuki

(10) Patent No.: US 11,731,601 B2
(45) Date of Patent: Aug. 22, 2023

(54) BRAKE SYSTEM

(71) Applicant: KABUSHIKI KAISHA TOYOTA JIDOSHOKKI, Kariya (JP)

(72) Inventor: Takanori Matsuki, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 256 days.

(21) Appl. No.: 17/091,250

(22) Filed: Nov. 6, 2020

(65) Prior Publication Data

US 2021/0146901 A1   May 20, 2021

(30) Foreign Application Priority Data

Nov. 15, 2019   (JP) .............................. JP2019-207423

(51) Int. Cl.
| | |
|---|---|
| *F16D 59/02* | (2006.01) |
| *B60T 13/68* | (2006.01) |
| *F16D 55/22* | (2006.01) |
| *F16D 65/22* | (2006.01) |
| *F16D 121/22* | (2012.01) |
| *F16D 129/08* | (2012.01) |

(52) U.S. Cl.
CPC ............ *B60T 13/686* (2013.01); *F16D 55/22* (2013.01); *F16D 65/22* (2013.01); *F16D 2121/22* (2013.01); *F16D 2129/08* (2013.01)

(58) Field of Classification Search
CPC .......... F16D 55/22; F16D 55/34; F16D 55/42; F16D 65/186; F16D 2121/06; F16D 2121/10; F16D 2121/22; F16D 2123/00; F16D 59/02; F16D 2127/02; F16D 65/22; F16D 2129/08; B60T 13/686
See application file for complete search history.

(56) References Cited

U.S. PATENT DOCUMENTS

| | | | | |
|---|---|---|---|---|
| 596,097 | A | * | 12/1897 | Wellman et al. .............. 246/240 |
| 1,748,773 | A | * | 2/1930 | Johnston .................. F16D 59/02 188/105 |

(Continued)

FOREIGN PATENT DOCUMENTS

| | | |
|---|---|---|
| CN | 101994770 A | 3/2011 |
| DE | 19849750 A1 * 5/2000 | ............. F16D 55/36 |

(Continued)

OTHER PUBLICATIONS

Extended European Search Report dated Jan. 22, 2021 from the European Patent Office in Application No. 20204651.2.

*Primary Examiner* — Nicholas J Lane
*Assistant Examiner* — Stephen M Bowes
(74) *Attorney, Agent, or Firm* — Sughrue Mion, PLLC

(57) ABSTRACT

A brake system includes an electromagnetic brake device configured to apply a brake to a rotary shaft when current is not applied to the brake system and release the brake on the rotary shaft when current is applied to the brake system; and a brake release device configured to forcibly release the brake on the rotary shaft when current is not applied to the brake system. The brake release device includes a guide member having a tube shape; a release plate disposed within the guide member and engaged with the armature; and a transfer unit that is configured to move the release plate in a direction in which the rotary shaft extends.

4 Claims, 9 Drawing Sheets

(56) References Cited

U.S. PATENT DOCUMENTS

| | | | | | |
|---|---|---|---|---|---|
| 1,762,420 | A | * | 6/1930 | Prime | ................... F16D 49/08 188/164 |
| 3,181,665 | A | * | 5/1965 | Trombetta | .............. F16D 59/02 188/170 |
| 6,142,266 | A | * | 11/2000 | Appeldorn | ............ B60T 13/743 188/72.3 |
| 2009/0114461 | A1 | | 5/2009 | Clark et al. | |

FOREIGN PATENT DOCUMENTS

| | | | |
|---|---|---|---|
| JP | 2002-295551 A | 10/2002 | |
| JP | 2019-035443 A | 3/2019 | |
| KR | 10-1381694 B1 | 4/2014 | |
| WO | WO-2005015043 A1 * | 2/2005 | ............. F16D 65/18 |

\* cited by examiner

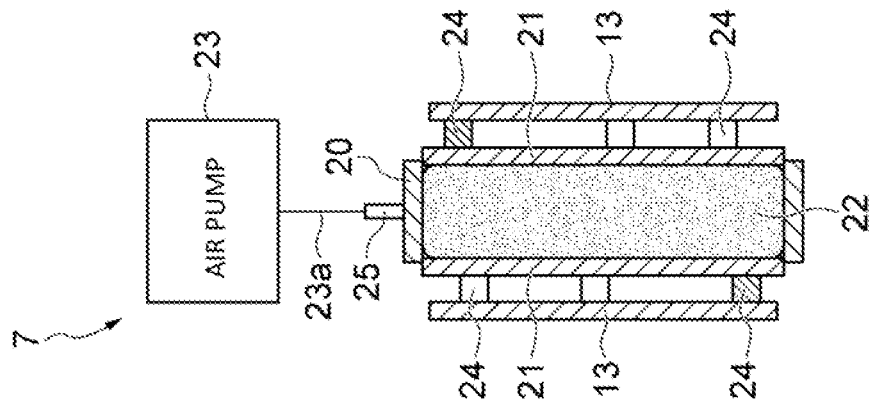
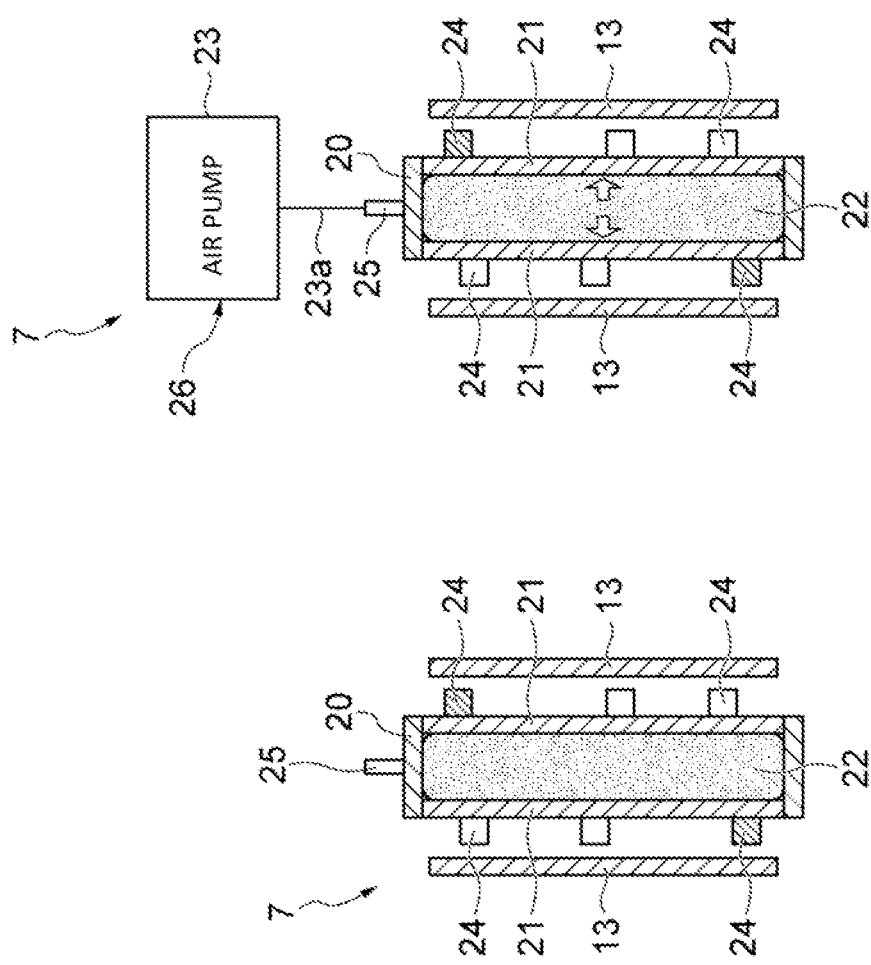

BRAKE SYSTEM

This application claims priority to Japanese Patent Application No. 2019-207423 filed on Nov. 15, 2019, the entire disclosure of which is incorporated herein by reference.

The present disclosure relates to a brake system.

BACKGROUND ART

Japanese Patent Application Publication No. 2002-295551 discloses, as a known brake system, a non-excitation electromagnetic brake, for example. In the non-excitation electromagnetic brake disclosed in the Publication, when current is not supplied to a magnet coil, an unload-side bracket is not excited and an armature is thus pressed against and contacts a brake lining by a force of a brake spring. This prevents the brake lining from rotating, thereby applying a brake to the motor shaft. When current is supplied to the magnet coil, the unload-side bracket is excited. The armature is thus drawn to the unload-side bracket against the force of the brake spring and moves away from the brake lining. This allows the brake lining to rotate and releases the brake on the motor shaft. The non-excitation electromagnetic brake further includes a manual releasing device. The manual releasing device includes a release cam that moves the armature away from the brake lining against the force of the brake spring, a manual release arm that rotates the release cam, and an arm holder that holds the manual release arm at a brake actuated position.

In the aforementioned known brake, if a space around a non-excitation electromagnetic brake device is small for operating the manual release arm, the brake on the motor shaft (rotary shaft) may not be released mechanically by the manual release device.

The present disclosure, which has been made in light of the above-mentioned problem, is directed to providing a brake system that releases a brake on a rotary shaft mechanically even when a small space is provided around an electromagnetic brake device.

SUMMARY

In accordance with one aspect of the present disclosure, there is provided a brake system that includes an electromagnetic brake device configured to apply a brake to a rotary shaft when current is not applied to the brake system and release the brake on the rotary shaft when current is applied to the brake system; and a brake release device configured to forcibly release the brake on the rotary shaft when current is not applied to brake system. The electromagnetic brake device includes a brake disc integrated with the rotary shaft; a stator disposed facing the brake disc; a brake plate positioned opposite to the stator with respect to the brake disc; an armature disposed between the brake disc and the stator and cooperating with the brake plate to hold the brake disc between the armature and the brake plate; an urging member disposed between the stator and the armature and configured to urge the armature such that the armature is pressed against the brake disc; and a magnet coil disposed in the stator and configured to be excited when current is applied to the magnet coil. The brake release device includes a guide member having a tube shape; a release plate disposed within the guide member and engaged with the armature; and a transfer unit that is configured to move the release plate in a direction in which the rotary shaft extends.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure together with objects and advantages thereof, may best be understood by reference to the following description of the presently preferred embodiments together with the accompanying drawings in which:

FIGS. 5A-5C are schematic sectional views of the brake release device illustrated in FIG. 2;

DETAILED DESCRIPTION OF THE EMBODIMENTS

Figure 1:
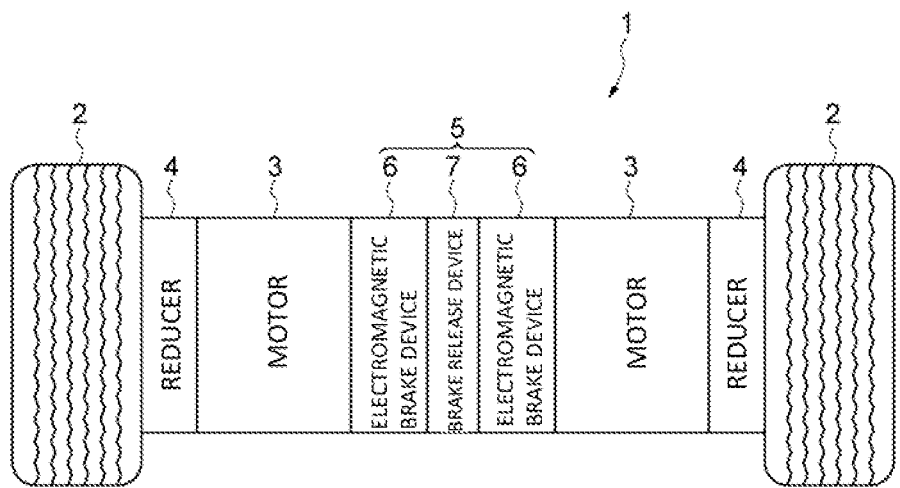
FIG. 1 is a schematic configuration diagram of a drive system including a part of a brake system according to a first embodiment of the present disclosure.

The following will describe embodiments of the present disclosure in detail with reference to the accompanying drawings. It is to be noted that, in the drawings, the same or substantially equal components are designated by the same reference numerals and will not be further elaborated.

FIG. 1 is a schematic configuration diagram of a drive system including a part of a brake system according to a first embodiment of the present disclosure. In FIG. 1, a drive system 1 is mounted to a vehicle. The drive system 1 includes two motors 3 that respectively rotate two wheels 2 disposed respectively right and left, two reducers 4 each disposed between the corresponding motor 3 and the wheel 2, and two electromagnetic brake devices 6 disposed between the two motors 3. The electromagnetic brake devices 6 are used as a parking brake of a vehicle, for example.

Figure 2:
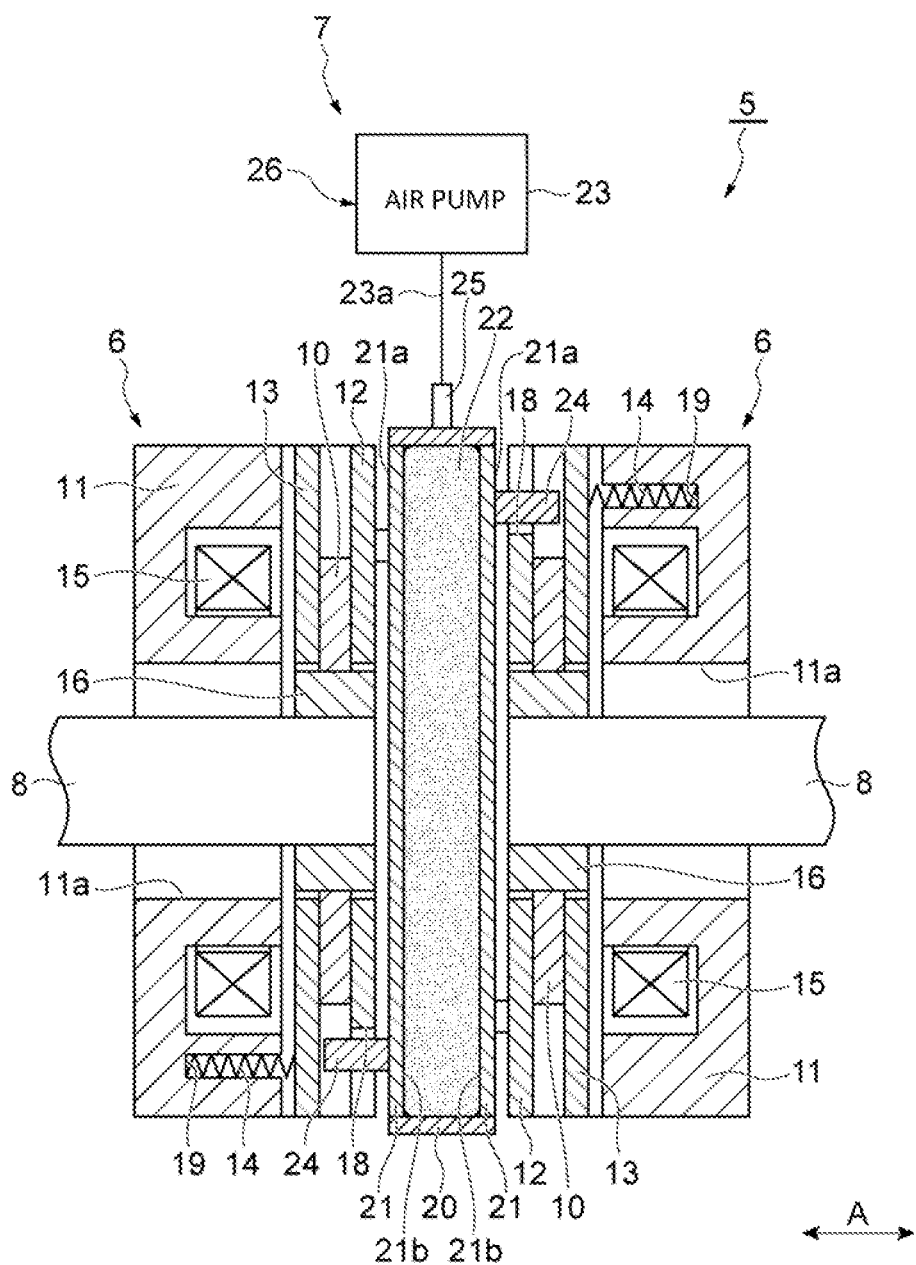
FIG. 2 is a sectional view of the brake system according to the first embodiment of the present disclosure.

FIG. 2 is a sectional view of the brake system according to the first embodiment of the present disclosure. In FIGS. 1 and 2, a brake system 5 of this embodiment includes the two electromagnetic brake devices 6 and a brake release device 7 disposed between the electromagnetic brake devices 6 (i.e., the electromagnetic brake device and the another electromagnetic brake device of the present disclosure).

Each electromagnetic brake device 6 is a non-excitation electromagnetic brake that is configured to apply a brake to a rotary shaft 8 of each motor 3 when current is not applied to the brake system 5 and release the brake on the rotary shaft 8 of the motor 3 when current is applied to the brake system 5. The brake release device 7 is configured to forcibly release the brake on the rotary shaft 8 of the motor 3 when current is not applied to the brake system 5.

Figure 3:
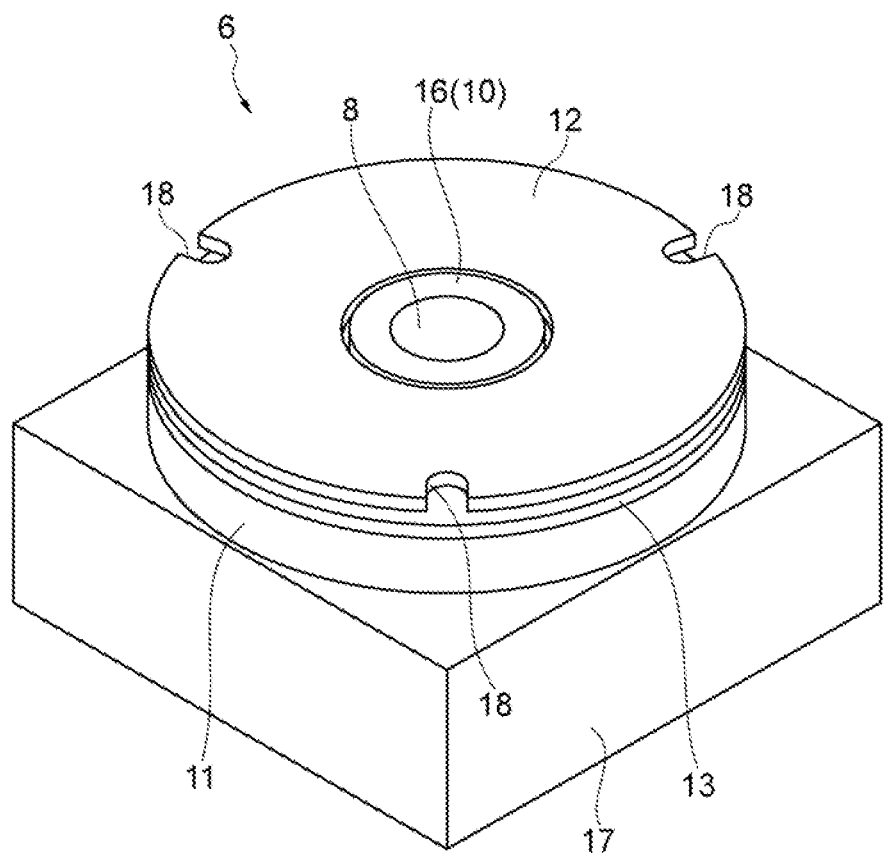
FIG. 3 is a schematic perspective view of an electromagnetic brake device illustrated in FIG. 2.

The electromagnetic brake device 6 includes, as illustrated in FIGS. 2 and 3, a brake disc 10, a stator 11, a brake plate 12, an armature 13, a plurality of coil springs 14, and a magnet coil 15.

The brake disc 10 is integrated with the rotary shaft 8 of the motor 3 via a fixed part 16 having a cylindrical shape. The brake disc 10 rotates together with the rotary shaft 8 of the motor 3.

The stator 11 is attached to a brake base 17. The stator 11 is disposed facing the brake disc 10 across the armature 13. The stator 11 has a through hole 11a through which the rotary shaft 8 of the motor 3 passes.

The brake plate 12 is positioned opposite to the stator 11 (the brake plate 12 is proximate to the brake release device 7) with respect to the brake disc 10. Although not illustrated, the brake plate 12 is fixed to the stator 11, for example, with screws, via a fixed part. The brake plate 12 has, in a peripheral portion thereof, a plurality of cutouts 18 (in this embodiment, three cutouts) through which a plurality of projections 24 (which will be described later) passes. The cutouts 18 each have a U-shape, for example.

The armature 13 is disposed between the brake disc 10 and the stator 11. Although not illustrated, the armature 13 is supported, for example, by the fixed part (aforementioned) that fixes the stator 11, such that the armature 13 is movable in a direction (a direction A in FIG. 2) in which the rotary shaft 8 extends. The armature 13 cooperates with the brake plate 12 to hold the brake disc 10 between the armature 13 and the brake plate 12 in the direction in which the rotary shaft 8 extends.

Each coil spring 14 is disposed between the stator 11 and the armature 13. Specifically, one end of the coil spring 14 is in contact with a bottom of a spring accommodation hole 19 that is formed in the stator 11. The other end of the coil spring 14 is in contact with the armature 13. The coil spring 14 serves as an urging member that urges the armature 13 such that the armature 13 is pressed against the brake disc 10.

The magnet coil 15 is disposed in the stator 11. The armature 13 is pressed toward the brake disc 10 by an urging force of the coil spring 14 when current is not applied to the magnet coil 15, so that the armature 13 and the brake plate 12 hold the brake disc 10 between the armature 13 and the brake plate 12 to apply the brake to the rotary shaft 8 of the motor 3.

The magnet coil 15 is excited when current is applied to the magnet coil 15, so that the armature 13 is drawn to the stator 11 against the urging force of the coil spring 14. Accordingly, the armature 13 is moved away from the brake disc 10 and the brake on the rotary shaft 8 of the motor 3 is released.

Figure 4:
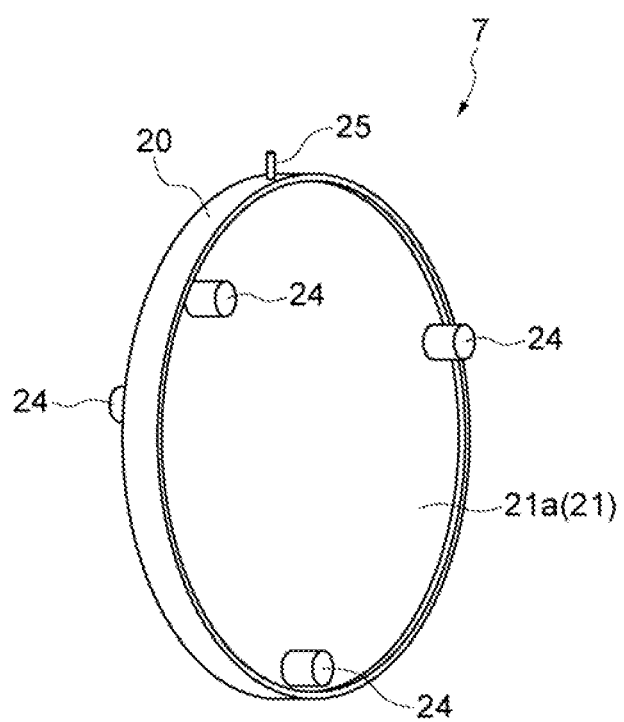
FIG. 4 is a perspective view of a part of a brake release device illustrated in FIG. 2.

The brake release device 7 includes a guide member 20 having a cylindrical shape, two release plates 21, a bag 22, and an air pump 23, as illustrated in FIGS. 2 and 4.

The release plates 21 are respectively disposed adjacent to opposite ends of the guide member 20 in the direction in which the rotary shaft 8 of the motor 3 extends such that the release plates 21 are movable in this direction. The direction in which the rotary shaft 8 of the motor 3 extends corresponds to an axial direction of the guide member 20. Each release plate 21 is a circular plate and engaged with the armature 13.

The release plate 21 has the plurality of projections 24 (in this embodiment, three projections) that is disposed on the peripheral portion of an outer surface 21a of the release plate 21 and configured to contact the armature 13 through the cutouts 18 of the brake plate 12. The outer surface 21a of the release plate 21 is one of the opposite surfaces of the release plate 21 and proximate to the electromagnetic brake device 6 compared with the other surface of the release plate 21. The projections 24 each have a solid-cylinder shape, for example.

The bag 22 is disposed between the two release plates 21 within the guide member 20. The bag 22 is formed of an elastic body, such as rubber. The bag 22 is configured to pneumatically expand and contract in the axial direction of the guide member 20. The bag 22 is in contact with inner surfaces 21b of the two release plates 21. The inner surface 21b of each release plate 21 is the other surface opposite to the outer surface 21a of each release plate 21. The bag 22 is not fixed to the release plate 21.

The bag 22 has an air valve 25 to introduce air into the bag 22. The air valve 25 protrudes outside the guide member 20 through a through hole (not illustrated) that is formed in the guide member 20.

The air pump 23 is a manual pump for manually supplying air into the bag 22. The air pump 23 has, at a distal end of a hose 23a of the air pump 23, a cap (not illustrated) to which the air valve 25 is attached. The air pump 23 serves as an air supplier that is configured to supply air into the bag 22.

The bag 22 and the air pump 23 cooperate to form a transfer unit 26 that is configured to move the release plate 21 in the direction in which the rotary shaft 8 of the motor 3 extends.

In the aforementioned brake system 5, as illustrated in FIG. 5A, each release plate 21 of the brake release device 7 is normally away from the armature 13 of the electromagnetic brake device 6. In this state, when current is not applied to the magnet coil 15, the armature 13 and the brake plate 12 hold the brake disc 10 between the armature 13 and the brake plate 12 to apply the brake to the rotary shaft 8 of the motor 3. In FIGS. 5A-5C, the brake disc 10 and the brake plate 12 are not illustrated for the sake of simplicity.

For example, to forcibly release the brake on the rotary shaft 8 in a state where electricity cannot be used, as illustrated in FIG. 5B, the cap (not illustrated) of the air pump 23 is attached to the air valve 25 of the bag 22. Then, the air pump 23 is manually operated to introduce air into the bag 22. The bag 22 is thus pneumatically expanded in the axial direction of the guide member 20 to press the two release plates 21.

Accordingly, as illustrated in FIG. 5C, the release plates 21 are moved away from one another, so that the projections 24 of each release plate 21 press the armature 13. The armature 13 is moved toward the stator 11 against the urging force of the coil spring 14 and away from the brake disc 10. Accordingly, the brake on the rotary shaft 8 is released without using electricity. When the release plate 21 presses the armature 13, the armature 13 serves as a reaction force receiver for the other armature 13.

Air in the bag 22 is released from the air valve 25 by removal of the cap (not illustrated) of the air pump 23 from the air valve 25 of the bag 22. This causes the bag 22 to contract in the axial direction of the guide member 20, so that the projections 24 of the release plate 21 move away from the armature 13.

To mechanically release the brake on the rotary shaft 8 of the motor 3, for example, a release screw may be tightened with a hexagonal wrench, or a manual release lever may be used. However, if a space around the electromagnetic brake device 6 is small for using a hexagonal wrench or a manual release lever, the brake on the rotary shaft 8 of the motor 3 may not be released.

To solve such a problem, in this embodiment, in a state where the armature 13 and the brake plate 12 hold therebetween the brake disc 10 to apply the brake on the rotary shaft 8, the transfer unit 26 moves the release plate 21 toward the electromagnetic brake device 6 along the direction in which the rotary shaft 8 extends, so that the release plate 21 presses the armature 13 toward the stator 11. The armature 13 thus moves toward the stator 11 against the urging force of the coil spring 14 and away from the brake disc 10 to release the brake on the rotary shaft 8. Accordingly, the brake on the rotary shaft 8 is mechanically released when a small space is provided around the electromagnetic brake device 6.

Further, in this embodiment, the plurality of projections 24, which is configured to contact the armature 13, is disposed on the peripheral portion of the outer surface 21a of the release plate 21, and the plurality of cutouts 18 through which the plurality of projections 24 passes is formed in the peripheral portion of the brake plate 12. Therefore, when the release plate 21 is moved by the transfer unit 26 toward the electromagnetic brake device 6, the projections 24 of the release plate 21 pass through the cutouts 18 of the brake plate 12 and press the armature 13 toward the stator 11. This configuration allows the brake on the rotary shaft 8 to be released even if the brake plate 12 has a large diameter, without a modification of the configuration of the armature 13.

Further, in this embodiment, the transfer unit 26 is disposed within the guide member 20, and includes the bag 22, which is configured to expand and contract in the direction in which the rotary shaft 8 extends, and the air pump 23, which supplies air into the bag 22. In this transfer unit 26, the bag 22 expands in the direction in which the rotary shaft 8 extends when the air pump 23 supplies air into the bag 22, so that the bag 22 presses the release plate 21. Accordingly, the release plate 21 moves toward the electromagnetic brake device 6 and presses the armature 13 toward the stator 11. In such a way, by operating the release plate 21 using air pressure, this configuration allows the brake on the rotary shaft 8 to be released at low cost.

Further, in this embodiment, the bag 22 is not fixed to the release plate 21. This configuration allows the guide member 20 accommodating the bag 22 to be disposed adjacent to the electromagnetic brake device 6 after the release plate 21 is attached to the electromagnetic brake device 6. This configuration thus allows the brake release device 7 to be used in a space around the electromagnetic brake device 6 even if the space is substantially small.

Further, in this embodiment, each release plate 21 is moved by the transfer unit 26 toward the corresponding electromagnetic brake device 6 and presses the armature 13 of the electromagnetic brake device 6 toward the stator 11, so that the armature 13 is moved away from the brake disc 10. This allows the brake on each rotary shaft 8 to be released coincidently even when a small space is provided around the electromagnetic brake device 6.

Further, in this embodiment, the bag 22 is not fixed to the release plate 21, but not limited to such a configuration. The bag 22 may be fixed to the release plate 21, for example, by adhesion joining.

Figure 6:
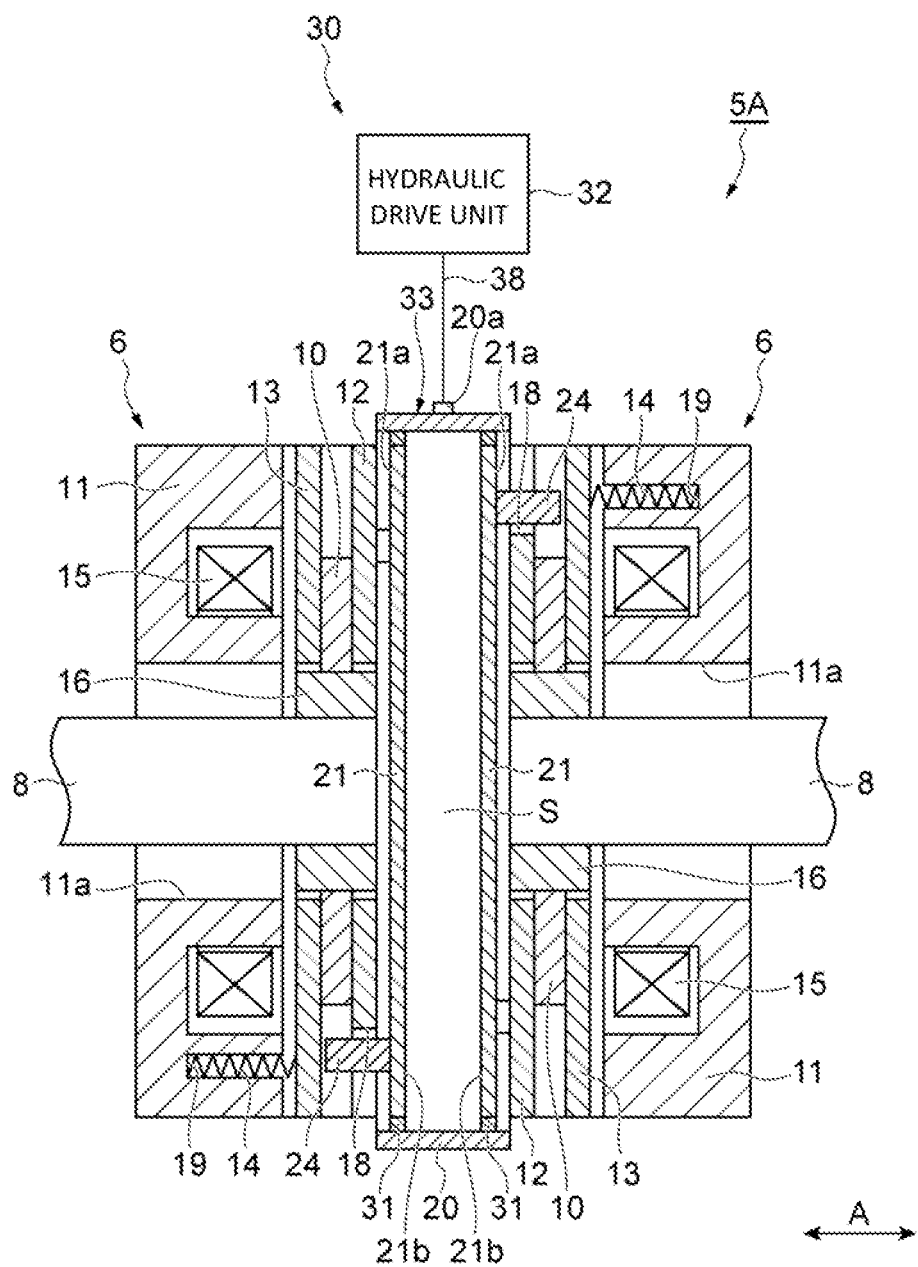
FIG. 6 is a sectional view of a brake system according to a second embodiment of the present disclosure.

FIG. 6 is a sectional view of a brake system according to a second embodiment of the present disclosure. In FIG. 6, a brake system 5A of this embodiment includes a brake release device 30 instead of the brake release device 7 of the first embodiment.

The brake release device 30 includes the guide member 20, the two release plates 21, two seal rings 31, and a hydraulic drive unit 32.

Each seal ring 31 is disposed between the guide member 20 and the release plates 21. The seal ring 31 seals a gap between the guide member 20 and the release plates 21.

The guide member 20, the release plates 21, and the seal rings 31 cooperate to form an actuator 33 that serves as a hydraulic cylinder. The guide member 20 has an introduction part 20a that introduces hydraulic oil into a space S (hereafter, the inside of the actuator 33) defined by the guide member 20, the release plates 21 and the seal rings 31.

Figure 7:
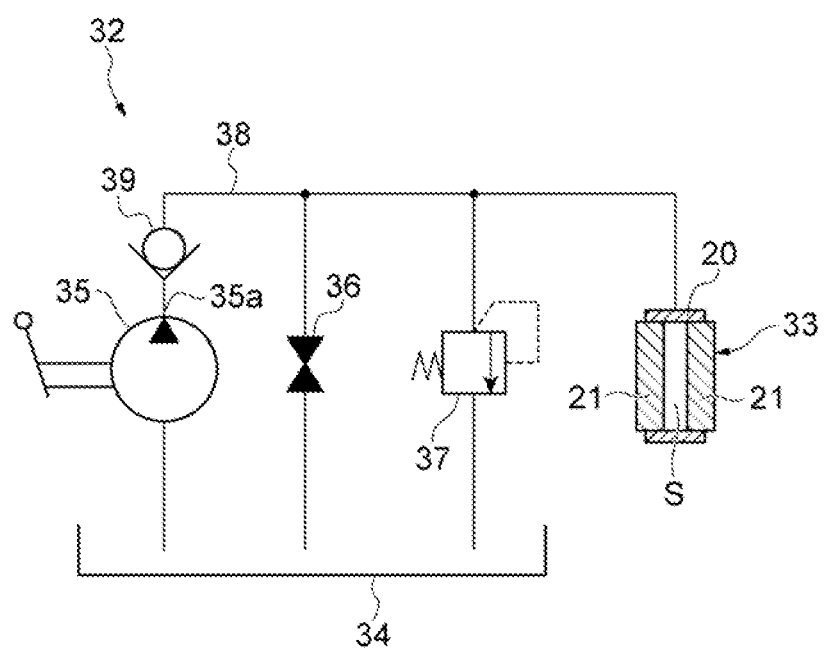
FIG. 7 is a circuit diagram of a hydraulic circuit of a hydraulic drive unit illustrated in FIG. 6.

FIG. 7 is a circuit diagram of a hydraulic circuit of the hydraulic drive unit 32. In FIG. 7, the hydraulic drive unit 32 includes a manual hydraulic pump 35 that draws hydraulic oil from a tank 34 and discharges it, and a pressure release valve 36 disposed between an outlet 35a of the hydraulic pump 35 and the tank 34. The hydraulic pump 35 serves as a hydraulic pressure source that supplies hydraulic oil to the inside of the actuator 33. The hydraulic pump 35 is operated, for example, with a hydraulic jack. The pressure release valve 36 is a manual valve configured to discharge hydraulic oil from the actuator 33 to the tank 34.

A relief valve 37 is disposed between the outlet 35a of the hydraulic pump 35 and the tank 34, and opens when the discharge pressure of the hydraulic pump 35 reaches and/or exceeds a set pressure. The outlet 35a of the hydraulic pump 35 is connected to the introduction part 20a of the guide member 20 (see FIG. 6) via a pipe 38. A check valve 39 for preventing backflow of the hydraulic oil to the outlet 35a of the hydraulic pump 35 is disposed on the pipe 38.

This hydraulic drive unit 32 serves as a transfer unit that moves the release plate 21 in the direction in which the rotary shaft 8 of the motor 3 extends.

In the brake system 5A, hydraulic oil is supplied from the hydraulic pump 35 to the inside of the actuator 33 when the hydraulic pump 35 is operated. The two release plates 21 are thus moved away from each other and toward their corresponding electromagnetic brake device 6 by a hydraulic pressure of the hydraulic oil, so that the projections 24 of each release plate 21 press the armature 13. The armature 13 is moved toward the stator 11 against the urging force of the coil spring 14 and away from the brake disc 10. Accordingly, the brake on the rotary shaft 8 of the motor 3 is released.

The hydraulic oil is discharged from the inside of the actuator 33 to the tank 34 when the pressure release valve 36 opens, so that the projections 24 of the release plate 21 are moved away from the armature 13.

In this embodiment, when the hydraulic oil is supplied from the hydraulic pump 35 into the space S defined by the guide member 20 and the release plates 21, the release plate 21 is moved, by a hydraulic pressure of the hydraulic oil, toward the electromagnetic brake device 6 along the direction in which the rotary shaft 8 extends. Therefore, the release plate 21 presses the armature 13 toward the stator 11. By operating the release plate 21 using air pressure, this configuration allows the brake on the rotary shaft 8 to be released even when the coil spring 14 having a high urging force is used.

Figure 8:
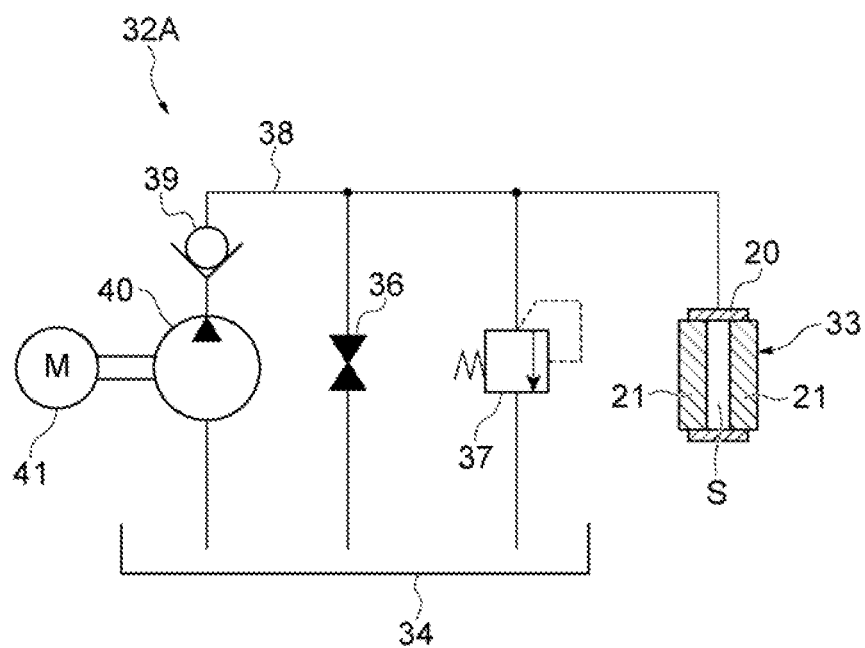
FIG. 8 is a circuit diagram of a modification of the hydraulic circuit of the hydraulic drive unit illustrated in FIG. 7.

FIG. 8 is a circuit diagram of a modification of the hydraulic circuit of the hydraulic drive unit 32 illustrated in FIG. 7. In FIG. 8, a hydraulic drive unit 32A of this modification includes an electric hydraulic pump 40 instead of the manual hydraulic pump 35. The hydraulic pump 40 is rotated by an electric motor 41.

Further, in the embodiments and the modification, the release plate 21 is moved by a hydraulic pressure of the hydraulic oil in the direction in which the rotary shaft 8 extends. However, a fluid for moving the release plate 21 is not limited to hydraulic oil, and the release plate 21 may be moved by a fluid, such as air or water.

The present disclosure has been explained with reference to the aforementioned embodiments, but is not limited to such embodiments. For example, the brake release device is disposed between the two electromagnetic brake devices 6 in the embodiments. However, if a single motor 3 is used along with a single electromagnetic brake device 6, the brake release device may be disposed only on one side of the single electromagnetic brake device 6.

Figure 9:
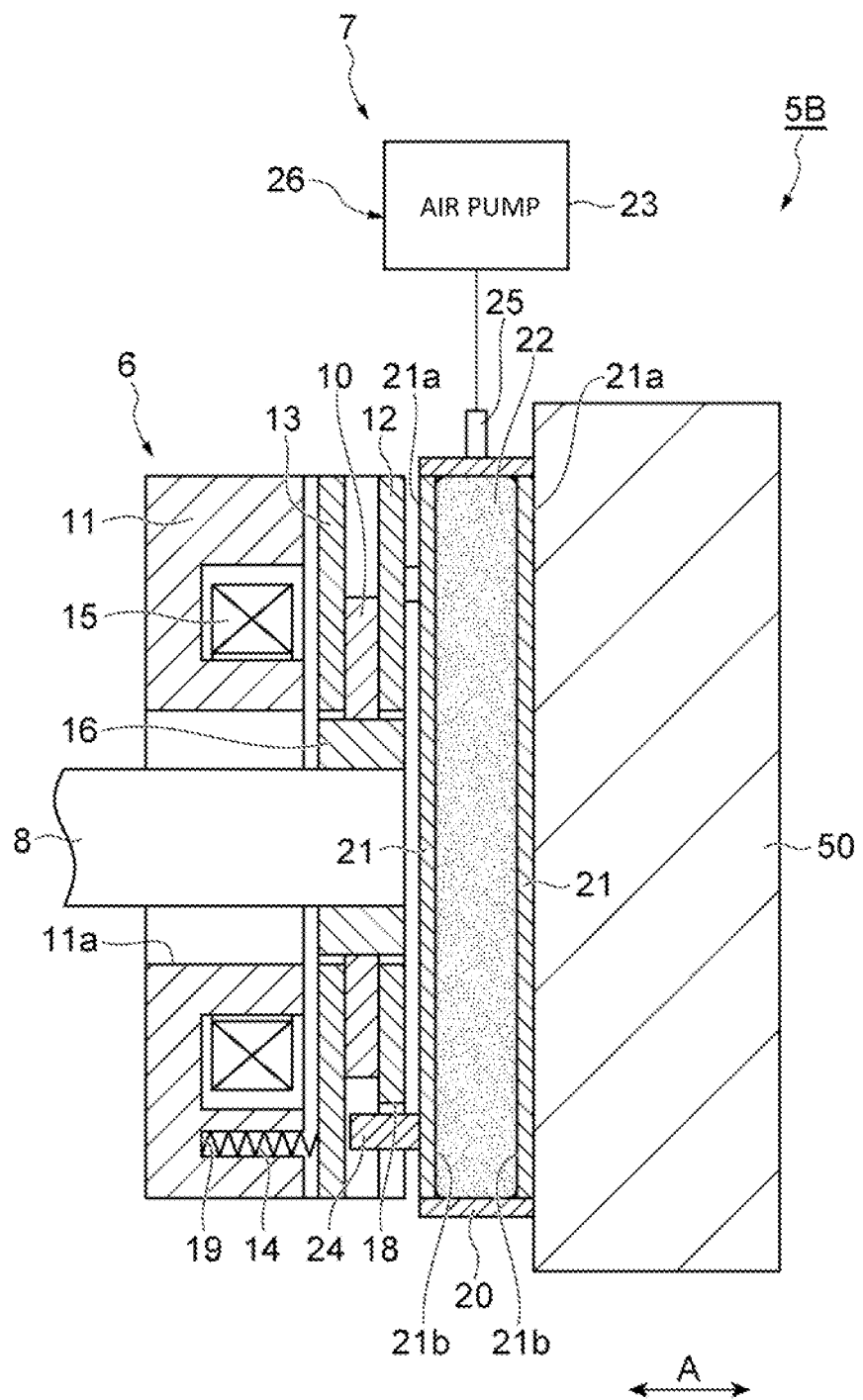
FIG. 9 is a sectional view of a modification of the brake system illustrated in FIG. 2.

FIG. 9 is a sectional view of a modification of the brake system 5 illustrated in FIG. 2. In FIG. 9, a brake system 5B of this modification includes the brake release device 7 that is disposed between the electromagnetic brake device 6 and a wall 50. In this configuration, the bag 22 expands toward the electromagnetic brake device 6 when the air pump 23 supplies air into the bag 22, so that the release plate 21 proximate to the electromagnetic brake device 6 is pressed by the bag 22 to press the armature 13 toward the stator 11. This allows the brake on the rotary shaft 8 to be released even when a small space is provided between the electromagnetic brake device 6 and the wall 50.

Further, in the aforementioned embodiments, the plurality of projections 24, which is configured to contact the armature 13, is disposed on the peripheral portion of the outer surface 21a of the release plate 21; however, the present disclosure is not limited to the embodiments, and a plurality of projections may be disposed on a peripheral portion of a surface of the armature 13 proximate to the brake disc 10 so as to contact the release plate 21.

Further, in this embodiment, the guide member 20 has a cylindrical shape, but the guide member 20 may have any tube shape, such as a square tube shape, as long as the release plate 21 is movable in the direction in which the rotary shaft 8 extends.

Further, the brake release device 7 and the brake release device 30 may be formed separately from the electromagnetic brake device 6. The brake release device 7 and the brake release device 30 may be attached to the electromagnetic brake device 6 when the brake on the rotary shaft 8 is desired to be forcibly released.

What is claimed is:

1. A brake system comprising:
an electromagnetic brake device configured to apply a brake to a rotary shaft when current is not applied to the brake system and release the brake on the rotary shaft when current is applied to the brake system; and
a brake release device configured to forcibly release the brake on the rotary shaft when current is not applied to the brake system, wherein
the electromagnetic brake device includes:
a brake disc integrated with the rotary shaft;
a stator disposed facing the brake disc;
a brake plate positioned opposite to the stator with respect to the brake disc;
an armature disposed between the brake disc and the stator and cooperating with the brake plate to hold the brake disc between the armature and the brake plate;
an urging member disposed between the stator and the armature and configured to urge the armature such that the armature is pressed against the brake disc; and
a magnet coil disposed in the stator and configured to be excited when current is applied to the magnet coil, and
the brake release device includes:
a guide member having a tube shape;
a release plate disposed within the guide member and engaged with the armature; and
a transfer unit configured to move the release plate in a direction in which the rotary shaft extends, wherein
the transfer unit is disposed within the guide member, and includes a bag that is configured to expand and contract in the direction in which the rotary shaft extends and an air supplier that is configured to supply air into the bag.

2. The brake system according to claim 1, wherein
the release plate has a plurality of projections on a surface of the release plate proximate to the electromagnetic brake device, wherein the plurality of projections is disposed on a peripheral portion of the surface and configured to contact the armature, and
the brake plate has a plurality of cutouts through which the plurality of projections passes, wherein the plurality of cutouts is formed in a peripheral portion of the brake plate.

3. The brake system according to claim 1, wherein the bag is not fixed to the release plate.

4. The brake system according to claim 1, wherein
the brake system includes another electromagnetic brake device, and the brake release device is disposed between the electromagnetic brake device and the another electromagnetic brake device, and
the release plate includes two release plates, and each of the two release plates is disposed adjacent to each of opposite ends of the guide member in the direction in which the rotary shaft extends.

* * * * *